United States Patent
Kinkel et al.

[11] Patent Number: 5,970,723
[45] Date of Patent: Oct. 26, 1999

[54] HEATING AND COOLING UNIT

[76] Inventors: Stephen W. Kinkel, 5419 East Calle del Medio, Phoenix, Ariz. 85018; Steven J. Goettl, 3001 North Ninth Avenue, Phoenix, Ariz. 85013; Peter J. Kinkel, 3224 East Mitchell Dr., Phoenix, Ariz. 85018

[21] Appl. No.: 08/959,685

[22] Filed: Oct. 29, 1997

Related U.S. Application Data

[63] Continuation of application No. 08/610,869, Mar. 5, 1996, abandoned.

[51] Int. Cl.[6] .............................. F28D 3/00; F25B 25/00
[52] U.S. Cl. ................................. 62/121; 62/171; 62/332
[58] Field of Search ............................ 62/171, 332, 175, 62/176.4, 121, 309; 165/60

[56] References Cited

U.S. PATENT DOCUMENTS

| | | | |
|---|---|---|---|
| 1,909,164 | 5/1933 | Bulkeley | 165/60 X |
| 1,933,330 | 10/1933 | Johnson | 165/60 X |
| 3,182,718 | 5/1965 | Goettl | 165/60 |
| 3,859,818 | 1/1975 | Goettl | 62/311 |
| 4,178,764 | 12/1979 | Rowe | 62/81 |
| 4,232,531 | 11/1980 | Mangam, Jr. et al. | 62/171 |
| 4,493,195 | 1/1985 | Zalesak et al. | 62/402 |
| 4,505,327 | 3/1985 | Angle et al. | 165/48 R |
| 4,803,849 | 2/1989 | Diaz | 62/311 |
| 5,106,543 | 4/1992 | Dodds | 261/36.1 |
| 5,282,726 | 2/1994 | Warren | 417/243 |
| 5,309,726 | 5/1994 | Asbridge | 62/91 |
| 5,377,500 | 1/1995 | Yang | 62/238.6 |
| 5,390,505 | 2/1995 | Smith et al. | 62/173 |
| 5,435,382 | 7/1995 | Carter | 165/110 |

*Primary Examiner*—William Wayner
*Attorney, Agent, or Firm*—Meschkow & Gresham, P.L.C.; Jordan M. Meschkow; Lowell W. Gresham

[57] ABSTRACT

An apparatus for maintaining an enclosed space proximate a selected comfort range, and for conserving utilities, the apparatus comprising a housing in communicating relation with the enclosed space and the external environment and having an evaporative cooler for cooling the enclosed space and having a predetermined operating efficiency, and a spaced apart air conditioner for either selectively cooling or heating the enclosed space and having an operating efficiency different from the evaporative cooler, and a control mechanism for automatically and selectively switching back and forth from operation of the evaporative cooler to the air conditioner.

13 Claims, 13 Drawing Sheets

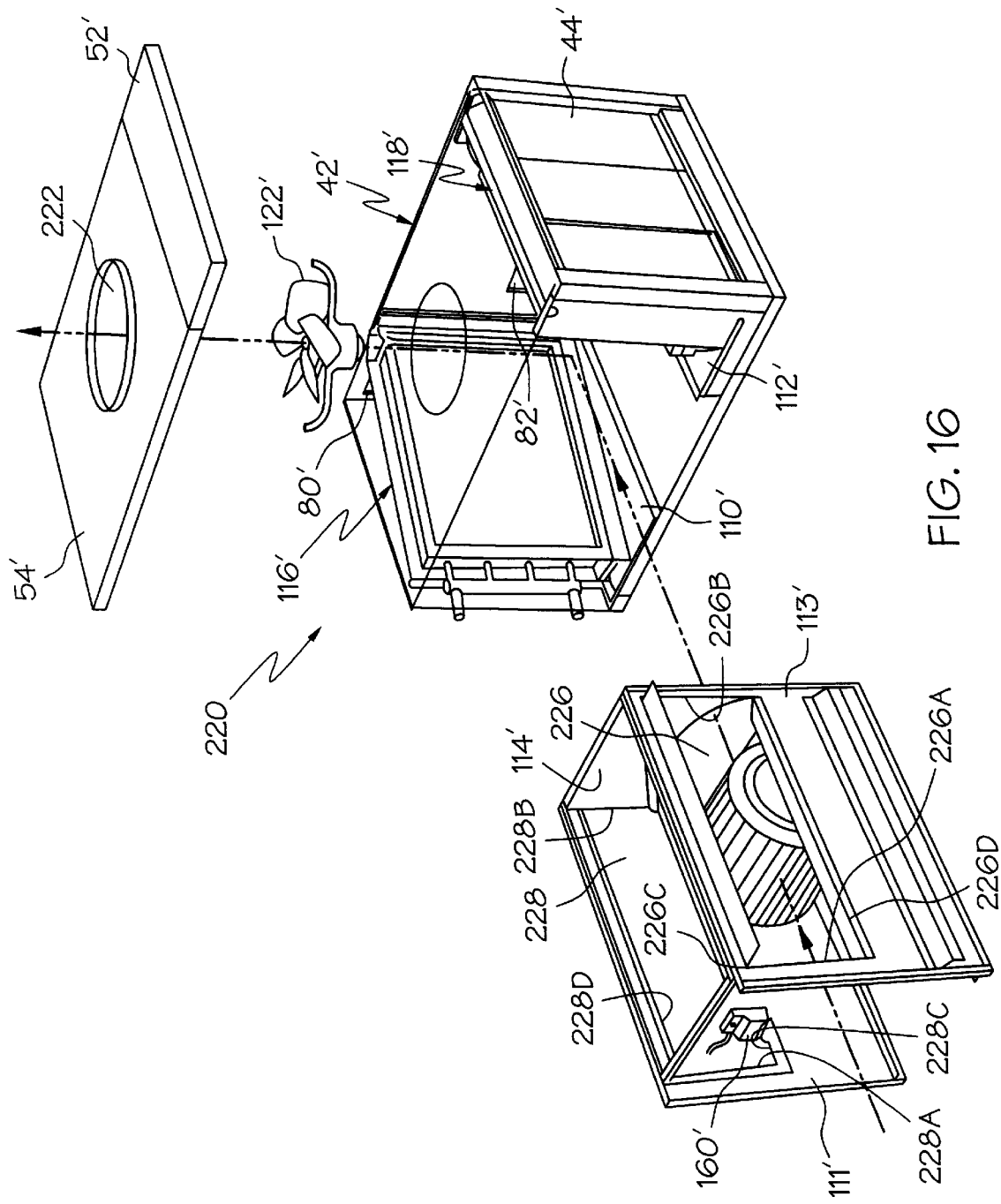

HEATING AND COOLING UNIT

This application is a continuation of application Ser. No. 08/610,869, filed Mar. 5, 1996, now abandoned.

BACKGROUND OF THE INVENTION

1. Field of the Invention

This invention relates to heating and cooling apparatus.

More particularly, this invention relates to heating and cooling apparatus for use in combination with structures.

In a further and more specific aspect, the instant invention relates to a heating and cooling unit for maintaining an environment enclosed by a structure at a selectively desired comfort range.

2. Prior Art

Air-conditioning is normally defined as the control of temperature, humidity, purity, and motion of air in an enclosed space, independent of outside conditions. There exist a variety of apparatus and methods to control the environmental conditions of an enclosed space, stemming from the primitive means of hanging wet grass mats over windows for cooling air by evaporation, to more advanced techniques that employ more sophisticated air-conditioning technology.

For instance, in a simple air conditioner, a refrigerant, normally consisting of Freons (carbon compounds containing fluorine and chlorine or bromine), in a volatile liquid form, is passed through a set of evaporator coils across which air inside a room or enclosed space is passed. The refrigerant evaporates and, in the process, absorbs the heat contained in the air. When the cooled air reaches its saturation point, its moisture content condenses on fins placed over the coils. The water runs down the fins and drains. The cooled and dehumidified air is returned into the room by means of a blower. During this process, the vaporized refrigerant passes into a compressor where it is pressurized and forced through condenser coils, which are in contact with the outside air. Under these conditions, the refrigerant condenses back into a liquid form and gives off the heat it absorbed inside the enclosed space. This heated air is expelled to the outside, and the liquid recirculates to the evaporator coils to continue the cooling process. In some units, the two sets of coils can reverse functions so that in winter, the inside coils condense the refrigerant and heat rather than cool the room or enclosed space. Such a unit is typically referred to as a heat pump.

Although air-conditioning units of these types are exemplary, they are expensive to operate as they use a tremendous amount of electrical power, and the refrigerant must be periodically replaced or replenished. Furthermore, the chemicals used in air conditioners contain chlorofluorocarbons, which are proven harmful to humans and the environment. Additionally, air-conditioner units typically recirculate the air in an enclosed structure, and the recirculated air eventually becomes stale and impure over time.

Another system of cooling air in an enclosed space is simply by means of passing air through water for cooling the air by means of evaporation. The apparatus used for accomplishing this method of cooling are normally referred to as evaporative coolers. Although evaporative coolers are less expensive to operate than the air conditioners that use refrigerant as discussed above, and they do not recirculate the air as do the air conditioners, they are not very effective when the 1% coincident wet bulb temperatures are high.

Thus, although evaporative coolers are less costly to operate, air-conditioning units are more effective at higher 1% coincident wet bulb temperatures. Furthermore, over time, evaporative coolers tend to use lots of water, and provide a buildup of humidity within the structure which can lead to mildew buildup, and an annoying mildew smell. In order to attain relief, windows in the structure must be opened to release the humid air, or relief vents can be provided for expelling the humid air.

Accordingly, many structures have both an air-conditioning apparatus, and an evaporative cooling apparatus, both of which are used for cooling the internal areas of the structure. However, in order to have both an air-conditioning unit and an evaporative cooler, both must be separately purchased, which is not only very expensive, but also inconvenient and time consuming to install. Additionally, when both an air-conditioning unit and an evaporative cooler unit are installed in combination with a structure, two penetrations into the structure are required which lead into two different sets of duct systems which also must be constructed at considerable cost. A further inconvenience of having both an air-conditioning unit and an evaporative cooler unit is that in order to switch use from one or the other as selectively desired, it must be done manually by either physically adjusting the individual units, or by means of a manual switch located apart from the individual units and normally within the structure.

Some cooling units include both an air-conditioning unit and an evaporative cooler unit that contains a damper and actuator mechanism that moves the damper back and forth from operation of the air-conditioning unit and the evaporative cooler unit, and through the manual operation of a remote control position switch. However, not only is it inconvenient to have to manually operate the remote control position switch, it is not always readily apparent to the user when it is more cost effective and efficient to switch to from either the air-conditioner unit or the evaporative cooler to the other.

Alternate systems of cooling include the use of chilled water. Water may be cooled by refrigerant at a central location and run through coils at other places. Water may be sprayed over glass fibers and air blown through it. Dehumidification is achieved in some systems by passing the air through silica gel which absorbs the moisture, and in others, liquid absorbents cause dehydration. Although these systems are exemplary, they use a tremendous amount of water, which can not only be expensive, but not very practical for dryer regions where water is less abundant.

The specific design of air-conditioning systems normally requires the consideration of a variety of variables and circumstances. For instance, some of the self-contained units, described above, serve an enclosed space directly. More complex systems, as in tall or large buildings, use ducts to deliver the cooled air. In the induction system, air is cooled once at a central plant, and then conveyed to individual units, where water is used to adjust the air temperature according to such variables as sunlight exposure and shade. In the dual-duct system, warm air and cool air travel through separate ducts and are mixed to reach a desired temperature. A simpler means of controlling temperature is to regulate the amount of cold air supplied, cutting it off once a desired temperature is reached. Since these types of systems require two distinct sets of ducts, one for carrying cool air and one for carrying warm air, they are normally very expensive to manufacture as a result of the requirement of having two sets of ducts, and very expensive to maintain.

It would be highly advantageous, therefore, to remedy the foregoing and other deficiencies inherent in the prior art.

Accordingly, it is an object of the present invention to provide a new and improved apparatus for heating and cooling.

Another object of the present invention is to conserve utilities.

And another object of the present invention is apparatus for heating and cooling that is relatively inexpensive to manufacture.

Still another object of the present invention is to provide an apparatus for heating and cooling having an automatic switching mechanism for selectively and automatically switching operation of the unit between air conditioning and evaporative cooling when the environmental conditions provide use of one is more efficient and cost effective than the other.

Yet another object of the instant invention is to eliminate the need for multiple penetrations through a structure, and the need for multiple duct systems.

Yet still another object of the instant invention is to eliminate the need for a user to purchase separate air conditioning and evaporative cooler units.

And a further object of the invention is eliminate the need for opening windows for relieving a structure of humid or stale air.

Still a further object of the immediate invention is to provide a heating and cooling unit that uses a common duct system.

Yet a further object of the invention is reduce energy costs associated with heating and cooling.

And still a further object of the invention is to provide a heating and cooling unit that is easily installed, and easily accessible for servicing and repair.

SUMMARY OF THE INVENTION

Briefly, to achieve the desired objects of the instant invention in accordance with a preferred embodiment thereof, provided is an apparatus for maintaining an enclosed space proximate a selected comfort range, and for conserving utilities. The apparatus is comprised of a heating and cooling unit having a housing in communicating relation with the enclosed space and the external environment and having an evaporative cooler for cooling the enclosed space and having a predetermined operating efficiency. Also included, and in spaced-apart relation to the evaporative cooler, is an air conditioner for either selectively cooling or heating the enclosed space and having an operating efficiency different from the evaporative cooler. Further included is a control mechanism for automatically and selectively switching back and forth from operation of the evaporative cooler to the air conditioner.

Also provided is a method for selectively maintaining a space enclosed by a structure proximate a selectively desired comfort range, and for conserving utilities. The method includes the steps of efficiently conditioning air to provide efficiently conditioned air to the space, and introducing the efficiently conditioned air into the space. The method further includes the steps of conditioning the air through a first apparatus having a predetermined operating efficiency, or conditioning the air through a second apparatus having a predetermined operating efficiency different from the operating efficiency of said first apparatus, and automatically controlling the selective operation of the first apparatus and the second apparatus for exploiting either the first apparatus or the second apparatus for maintaining the space proximate the predetermined comfort range and for conserving utilities.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 16 is an exploded perspective view of the embodiment first depicted in combination with FIG. 11;

DETAILED DESCRIPTION OF THE PREFERRED EMBODIMENTS

Figure 1:
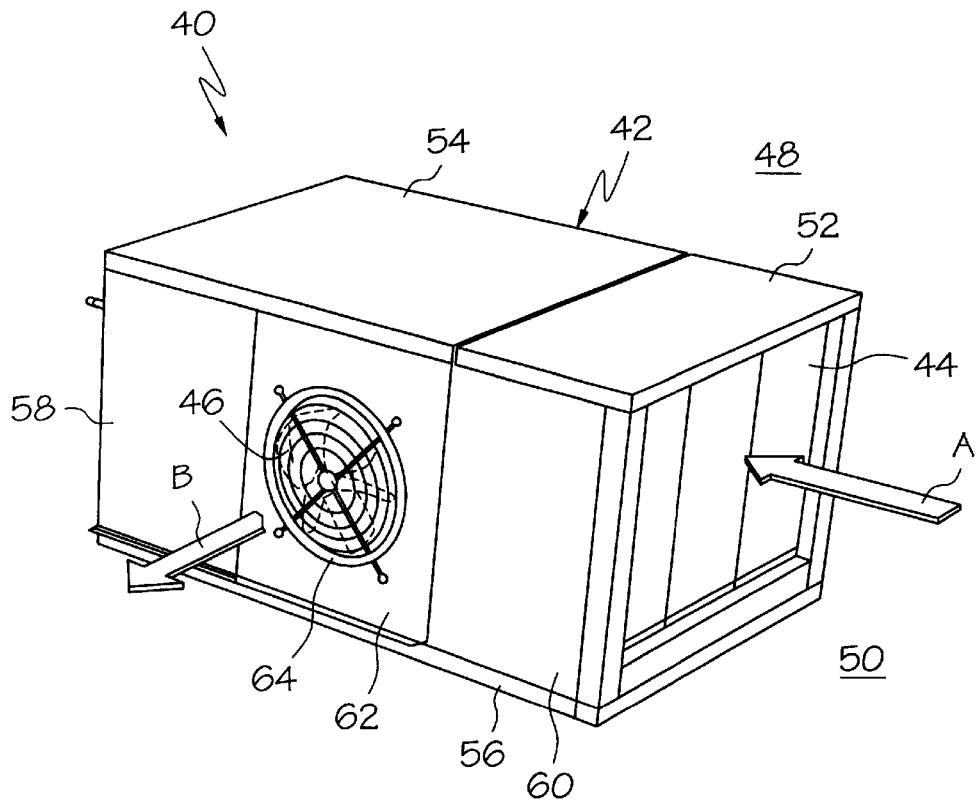
FIG. 1 is a front perspective view of an embodiment of the instant invention constructed in accordance with the preferred embodiment, the invention comprising a heating and cooling unit.

Turning now to the drawings, in which like reference characters indicate corresponding elements throughout the several views, attention is first directed to FIG. 1 which illustrates a first embodiment of the instant invention comprising a heating and cooling unit 40. The unit 40 is operative for controlling the environmental conditions, i.e., temperature and humidity, of an environment defined by an enclosed space, such as a room or the entire internal enclosed space of a structure such as a home, office building, warehouse, or the like. In a more specific aspect, as will be herein specifically described as the detailed description ensues, unit 40 includes a cooling means for selectively lowering the temperature or cooling the space defined within an enclosed structure, and a conditioning means for either cooling or heating the enclosed space as selectively desired. The cooling capabilities, efficiencies, and costs of operation of the cooling means and the conditioning means differ with respect to different external environmental conditions, details of which will be herein further specifically described.

Figure 2:
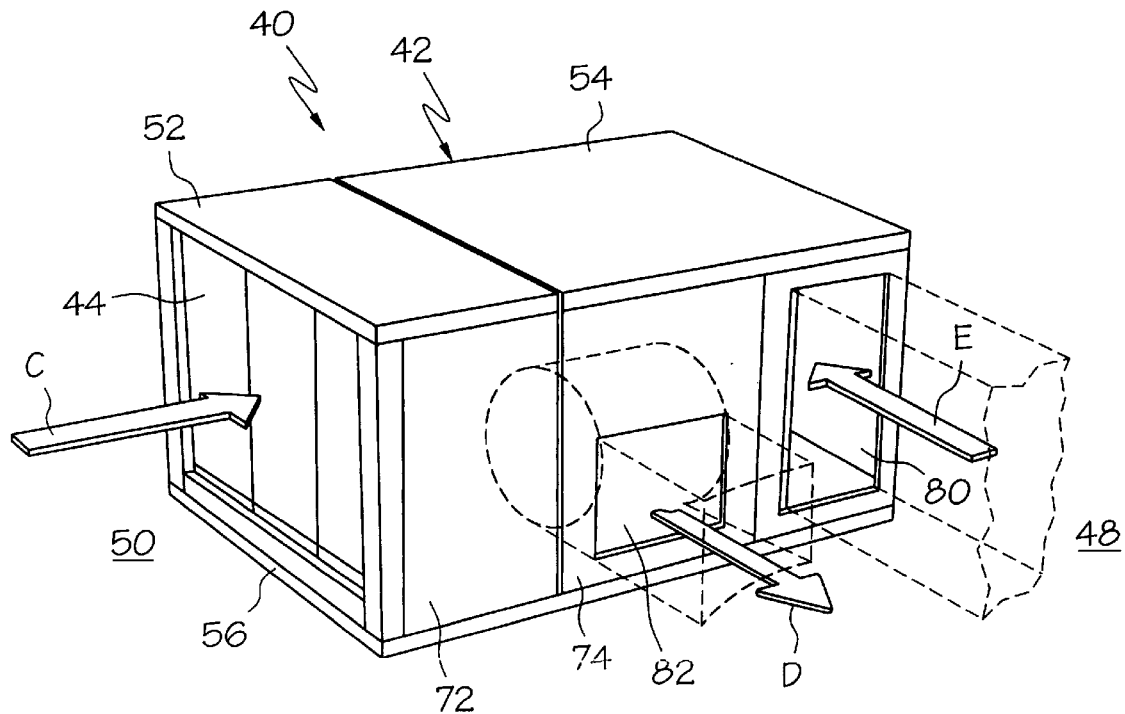
FIG. 2 is a rear perspective view of the embodiment depicted in combination with FIG. 1.
Figure 3:
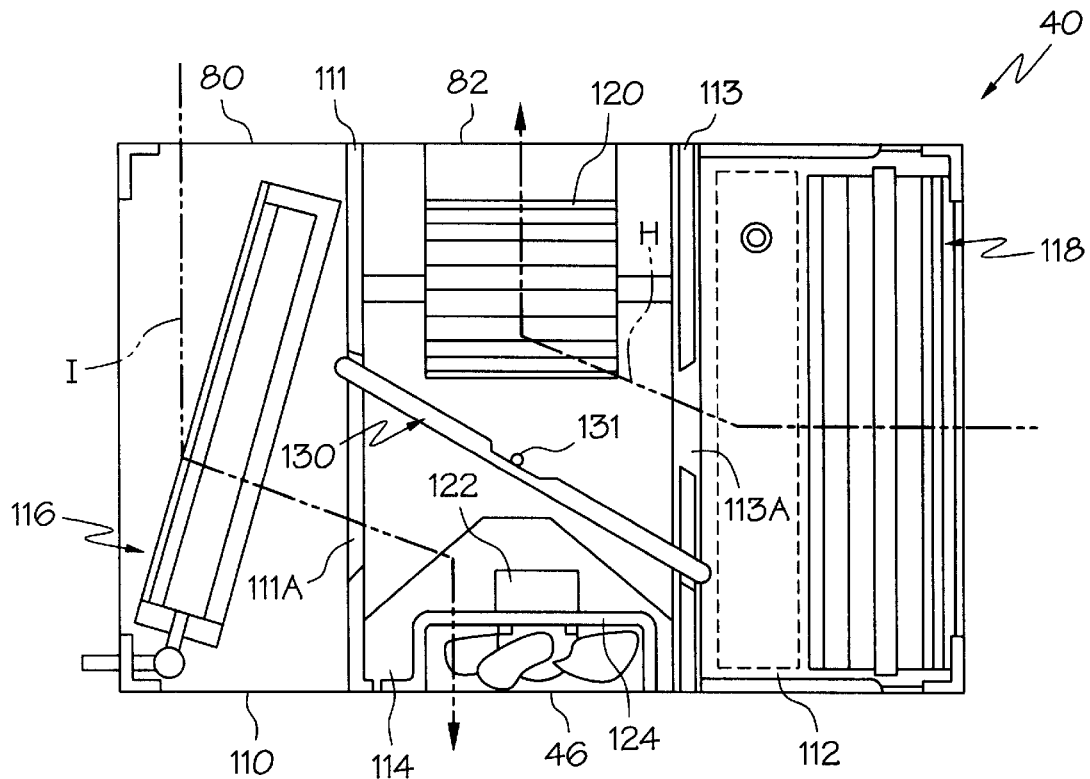
FIG. 3 is a top plan view of the instant invention of FIG. 1 with portions therein being removed for the purpose of illustration.
Figure 4:
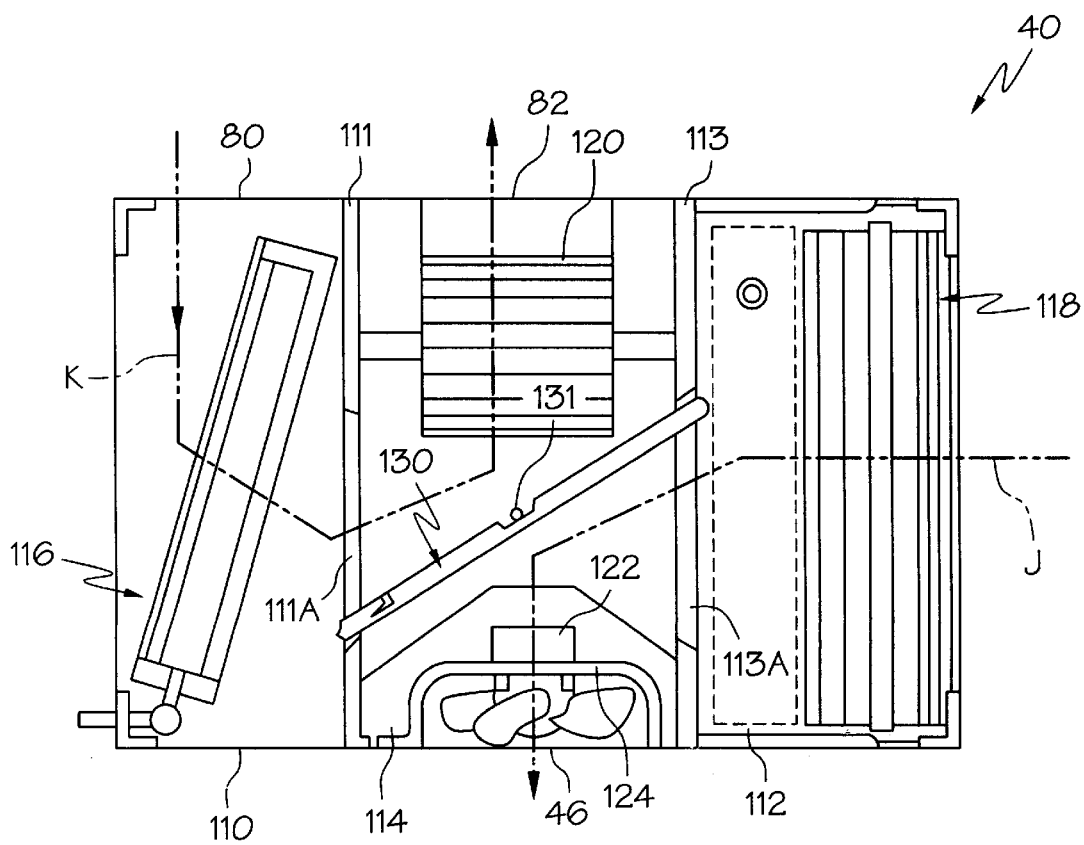
FIG. 4 is a view very similar to the view of FIG. 3.

Consistent with the foregoing, attention is directed again to FIG. 1, and further to FIG. 2, FIG. 3, and FIG. 4, all of which illustrate the first embodiment of the instant invention. As can be seen in FIG. 1 and FIG. 2, unit 40 includes a housing 42 which functions as an enclosure for enclosing and housing the internal working parts of the unit 40 of which will be discussed shortly. Preferably constructed of stainless steel, aluminum, or other preferred material capable of withstanding adverse environmental conditions, housing 42 has a generally rectangular configuration. Unit 40 may be mounted in an attic, on a roof, or on the ground next to a structure as selectively desired.

As can be seen in FIG. 1 and FIG. 2, arrow A and arrow C indicate the passage of air into unit 40 through side end panel 44 which defines a main inlet, and arrow B indicates the passage of exhaust air through exhaust port 46 which defines a main outlet. End panel 44 is basically a filter through which air that passes is filtered by trapping particulate matter and other undesired foreign substances. As it will be herein discussed, when air passes into unit 40, it is either heated or cooled, directed into an enclosed space 48 defined by a structure (not herein specifically shown), and then either circulated by unit 40, or expelled by unit 40 in the form of exhaust. Preferably mounted on the roof of a structure to be heated and cooled, the air that passes into unit 40 normally comes from the outside external environment 50, and the air that unit 40 expels from exhaust port 46 is similarly expelled into the outside environment 50.

Figure 5:
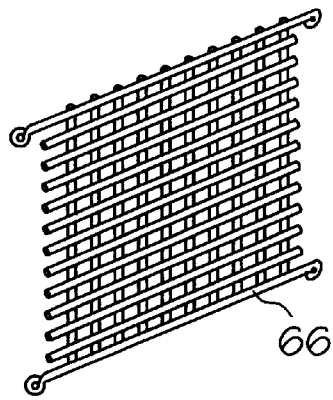
FIG. 5 is a perspective view of an embodiment of a grating used in combination with an exhaust port.

The housing 42 of unit 40 is preferably comprised of a removable first top panel 52, a removable second larger top panel 54, and a base panel 56. The first top panel 52 and the second larger top panel are preferably removable for allowing easy access to the enclosed working parts for facilitating easy repair or replacement of worn or broken parts. Also included is a first removable outer side panel 58, a second removable outer side panel 60, and a removable intermediate outer side panel 62 having the exhaust port 46 extending therethrough, the exhaust port 46 being enclosed by a generally circular protective grating 64 which is coupled to portions of intermediate side panel 62. With momentary reference to FIG. 5, shown is an alternate embodiment of a protective grating that may be used in lieu of protective grating 64. As can be seen, FIG. 5 illustrates a generally rectangular protective grating 66.

Referring again to FIG. 2, housing 42 further includes a first inner side panel 70, a second inner side panel 72, and an intermediate inner side panel 74, all of which normally abut a structure. First inner side panel 70 includes a generally rectangular air inlet port 80, and the intermediate inner side panel includes a smaller and more square air outlet port 82. Air inlet port 80 and air outlet port 82 are preferably coupled to passages or ducts which lead into the enclosed space defined by a structure, and which facilitate air communicating relation between unit 40 and the enclosed space. Air that has been either cooled or heated by unit 40 passes through air outlet port 82 in the direction as indicated by arrow D for introduction into the structure for either heating or cooling the enclosed space. Additionally, air inlet port 80 operates for receiving air from the enclosed space of a structure in the direction as indicated by arrow E for allowing unit 40 to either recirculate the air back into the structure, or expel the air through the exhaust port 46, details of which will be herein discussed.

Figure 6:
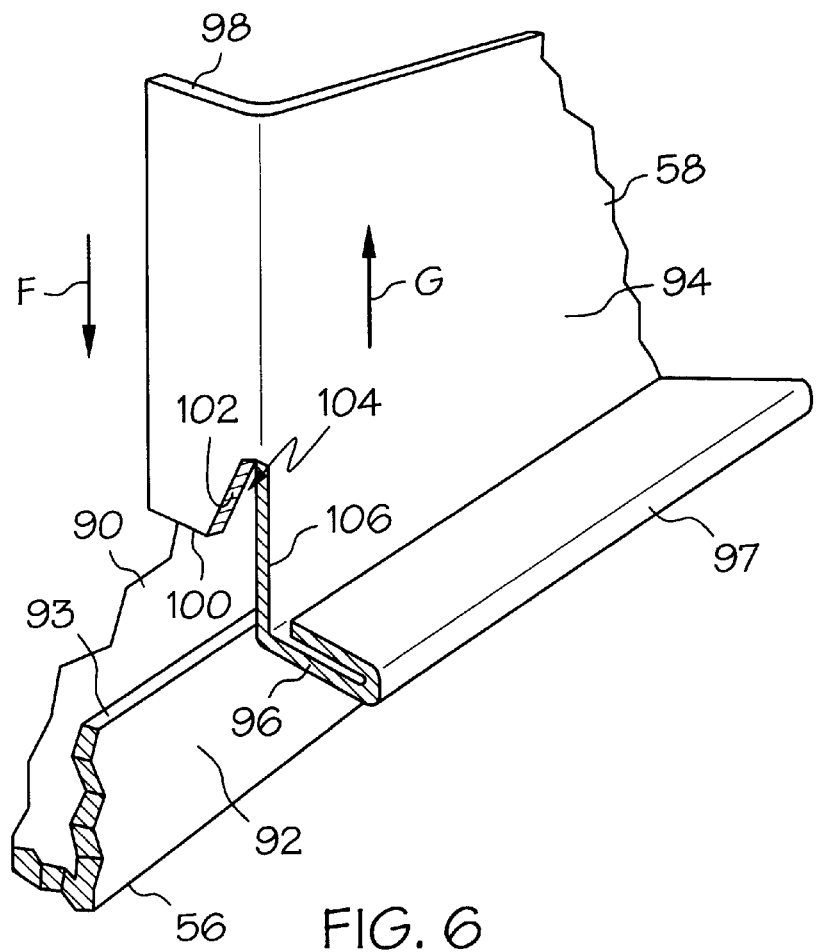
FIG. 6 is an enlarged fragmentary perspective view of portions of a housing.

Referring momentarily FIG. 6, illustrated are portions of first side panel 58 and base panel 56. From FIG. 6, it can be seen that base panel 56 includes a generally planar bottom panel 90 having a generally peripheral upstanding sidewall 92 which terminates with an upper edge 93. First side panel 58, includes a substantially planar side wall 94 having a lower outwardly and laterally extending flange 96 residing in a substantial horizontal plane and terminating with a generally rounded out end 97, and an inwardly extending longitudinal flange 98 having a lower end 100 residing in a higher generally horizontal plane. Longitudinal flange 98 includes a lower generally inwardly extending edge 102 terminating with lower end 100 which defines an generally inverted V-shaped gap 104 being further defined by a terminal outer edge portion 106 of first side panel 58.

First side panel 58 may be either easily coupled to or easily remove from base panel 56. For coupling first side panel 58 to the base panel 56, first side panel may be disposed in the direction indicated by arrowed line F in FIG. 6 so that upstanding sidewall 92 becomes frictionally engaged or pinchedly retained within gap 104. Similarly, first side panel 58 may be easily detached or disengaged from upstanding sidewall 92 of base panel 56 when selectively disposed in the direction indicated by arrowed line G. The flange 96 may be easily and conveniently gripped or held for either engaging or disengaging the first side panel 58 from the base panel. Although not herein specifically shown, it will be readily understood that the other side panel sections of housing 42 may include similarly constructed elements for allowing easy removal of the side panels for access into the internal portions of unit 40 enclosed by housing 42, and for easy engagement of the respective side panels with the base panel 56.

Referring now to FIG. 3 and FIG. 4, illustrated are the internal mechanisms of unit 40. With respect to the preferred embodiment, housing 42 of unit 40 essentially defines three distinct internal sections, section 110, section 112, and section 114 located intermediate section 110 and section 112, all of which are in air communicating relation. Section 110, being separated from section 114 by means of a partition 111 having an opening 111A formed therethrough, houses a preferred conditioning means comprising an air-conditioning apparatus 116 of the conventional type, such as one provided from Fraser-Johnson® model number EDHP-FO60S stock number 4E347, which uses a refrigerant such as Freon for selectively heating air passed therethrough, or for cooling air passed therethrough. Since air-conditioning apparatus 116 is of the conventional type, further details specific therewith will not be herein specifically described as they will be readily understood by those having ordinary skill in the relevant art. Section 112, being separated from section 114 by means of a partition 113 having an opening 113A formed therethrough, houses a preferred cooling means comprising an evaporative cooling apparatus 118, such as one provided from Fraser Johnson® model number MCHD060S stock number 3F456, of the conventional type which uses water for cooling air that passes through it. Since the evaporative cooling apparatus 118 is of the conventional type, further details specific therewith will not be herein specifically described as they will be readily understood by those having ordinary skill in the relevant art.

Section 114 houses a blower 120 for sucking air from outside unit 40 and for blowing the air into the enclosed space of a structure through the outlet port 82. The blower 120 is suitably located proximate air outlet port 82, and is further of a conventional sort normally used in combination with apparatus of the type herein specifically disclosed. Accordingly, further details of blower 120 will not be herein specifically discussed as they will be readily apparent and understood by those having ordinary skill in the relevant art.

Further housed proximate section 114 is seen a fan 122 coupled by means of a bracket element 124 proximate exhaust port 46 and operative for expelling or blowing exhaust air out of exhaust port 46. Further provided, and properly positioned proximate section 114 is seen a damper element 130 mounted to portions of the housing 42 proximate section 114 by means of a pivotal mount 131 located at a generally intermediate position proximate damper element 130, the damper element 130 being mounted for reciprocal horizontal pivotal movement. Damper element 130, further details of which will be herein discussed as the detailed description ensues, is operative for directing air provided from section 110 and section 112.

With specific reference to FIG. 3, damper element 130 is shown disposed in a first configuration. In this configuration, when blower 120 is operating and thereby sucking air in from outside unit 40, and blowing the air into the enclosed space of a structure, the air passes in the direction indicated by jagged arrow H through end panel 44, into section 112 and through evaporative cooling apparatus 118. The air then continues flow and passes through opening 113A into section 114 and against portions of damper element 130, into the blower 120, and out from the blower 120 through air outlet port 82 and into the enclosed space of a structure. As has been herein intimated, air passing through the evaporative cooling apparatus 118 is operative for providing cool air to the enclosed space of structure for cooling the enclosed space. Furthermore, when unit 40 is actuated, both the blower 120 and fan 122 are preferably actuated and operational. As such, as the air is introduced into the enclosed space of a structure, positive pressure builds up in the enclosed space in addition to humid air. As such, the fan 122 operates for blowing air provided from the enclosed space out of exhaust port 46 which indicates that fresh air provided from outside the unit 40 is constantly being supplied into the structure and then selectively expelled as exhaust from exhaust port 46 for relieving the positive pressure and for inhibiting the buildup of humid air or humidity within the enclosed space.

In particular, and with continuing reference to FIG. 3, once the air has been introduced into the enclosed space of the structure, the air is then drawn out of the enclosed space, either directly or indirectly through ducts, by fan 122 and from the positive pressure buildup. As a result the air passes in the direction indicated by jagged arrow I into section 110 through air inlet port 80. The air then passes through the air-conditioning apparatus 116 which is turned off when the evaporative cooling apparatus 118 is running, and through opening 111A into section 114. The air then passes against portions of damper element 130, through fan 122 and out exhaust port 46. From this discussion, it will be appreciated, that as air is passed into the enclosed space of a structure, positive pressure builds up in the enclosed space. As a result, the exhaust port 46 functions as a relief for relieving the positive pressure, and for inhibiting the buildup of moist air provided from the evaporative cooling apparatus 118.

Referring to FIG. 4, the damper element 130 is shown disposed in a second configuration. In the second configuration, the evaporative cooling apparatus 118 is not operational, and the air-conditioning apparatus 116 is operational for either heating the enclosed space, or cooling the enclosed space as selectively desired. As indicated by the jagged arrow J, air from outside unit 40 can be seen as passing through end panel 44 and into section 112. From section 112, the air then passes through opening 113A and into section 114, the air then being directed against portions of damper element 130 and then out the exhaust port 46. Further provided in this second configuration, the air-conditioning apparatus 116 is operational with blower 120 blowing and recirculating the air within the enclosed space of the structure. In further detail, air from the enclosed space of the structure passes in the direction indicated by jagged arrow K through air inlet port 80 and into section 110. From section 110, the air then passes through the air-conditioning apparatus 116 and is either heated or cooled. From the air-conditioning apparatus 116, the conditioned air then passes through opening 111A into section 114, against portions of damper element 130, through blower 120 and is then projected from the blower 120 through air outlet port 82 and into the enclosed space either directly or indirectly by means of a duct.

The damper element 130 is selectively movable between the first configuration and the second configuration by means of a control means, to be herein discussed, which operates to switch the damper element back and forth from the first configuration to the second configuration as needed to maintain the enclosed space relative a selectively desired comfort range, and for also operating the unit 40 at optimal level for conserving the utilities necessary for operating the unit such as electricity, water, and perhaps natural gas if applicable.

Figure 7:
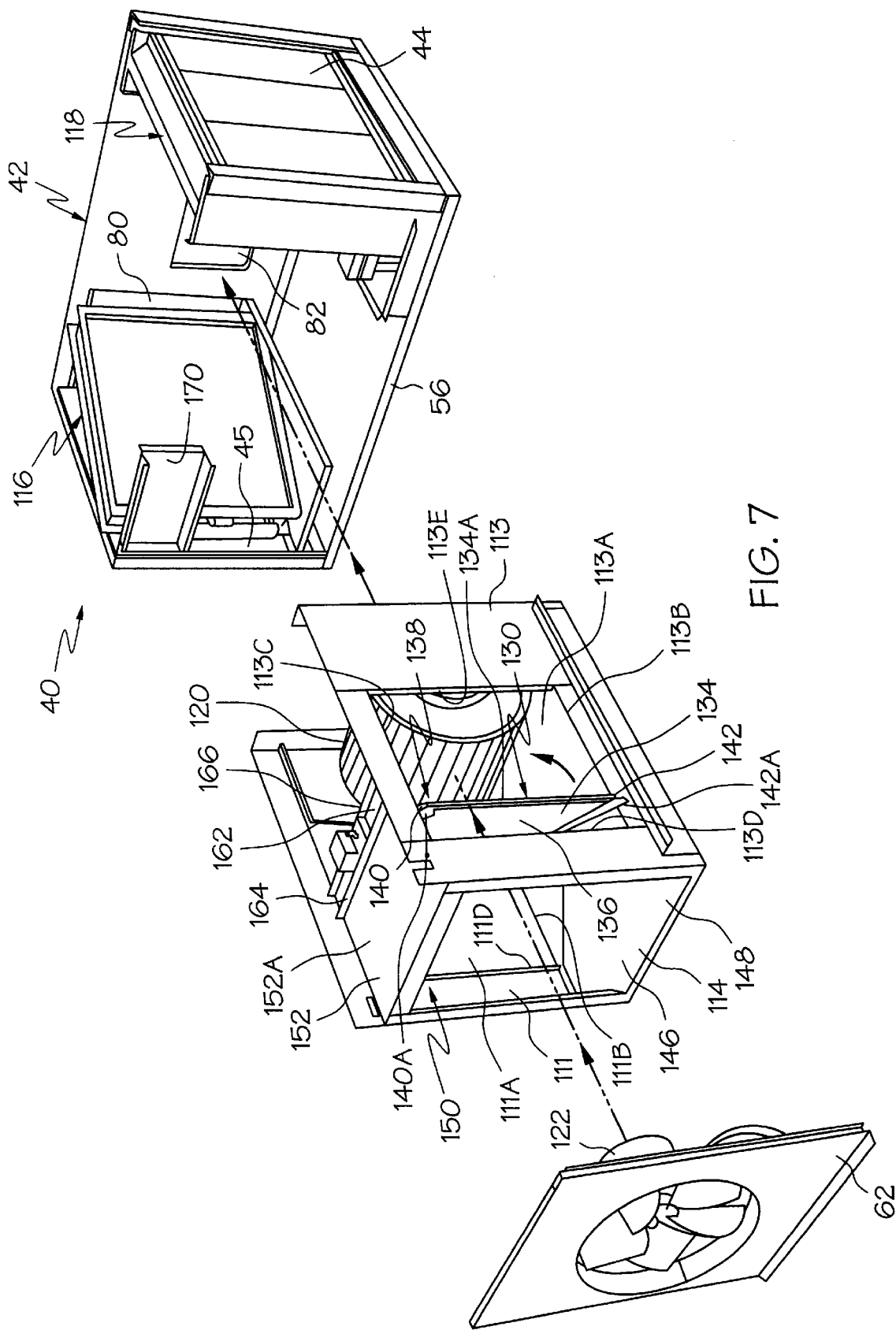
FIG. 7 is an exploded perspective view of the embodiment of the instant invention depicted in combination with FIG. 1.

Attention is now directed to FIG. 7, which illustrates an exploded perspective view of unit 40, and further showing the specific structural elements herein previously discussed in greater detail. As can be seen, housing 42, further shown as having a closed end panel section 45, is shown having the air inlet port 80 and the air outlet port 82, with the air-conditioning apparatus 116 and the evaporative cooling apparatus 118 housed therein. Shown extracted from housing 42 is seen section 114 having the blower 120 and the damper element 130 coupled therewith. Further seen spaced apart from section 114 is intermediate side panel 62 having fan 122 coupled therewith as has been herein previously discussed.

Figure 9:
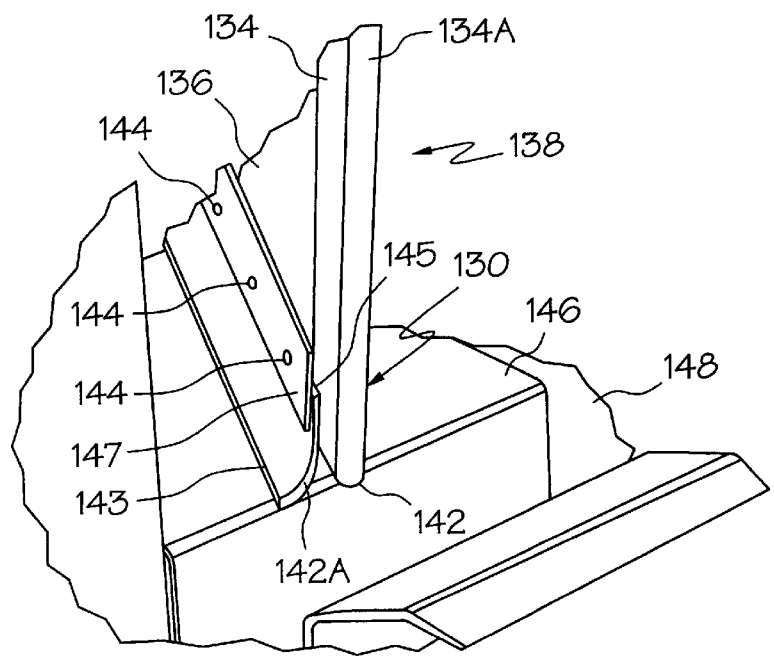
FIG. 9 is an enlarged fragmentary perspective view of a damper element seen in cooperation with other portions of the instant invention.

With respect to section 114 illustrated, seen is partition 113 having opening 113A extending therethrough being generally square in shape, and partition 111 having opening 111A extending therethrough and also being generally square in shape. The damper element 130, further details of which can be seen in combination with FIG. 9, is comprised of an upstanding panel member 134 being substantially planar and preferably constructed of aluminum, stainless steel, or the like, and having a first substantially planar surface 136, a second substantially planar surface 138, an upper edge 140 and a lower edge 142. Suitably located across both the entire length of upper edge 140 and lower edge 142 are seen substantially compliant elongate fins, 140A and 142A respectively. Fin 142A, suitably constructed of rubber or other similarly compliant substance, includes a lower edge 143, and an upper edge 145. Fin 142A is fixedly coupled proximate portions of the upstanding panel member 134 proximate lower edge 142 by means of a substantially rigid elongate bracket 147 coupled to the fin 142A and the upstanding panel member 134 by means of rivets 144, although screws or other means may suitably be used in lieu thereof as selectively and suitably desired. Although not herein specifically described, fin 140A is of substantially identical construction as fin 142A.

Figure 8:
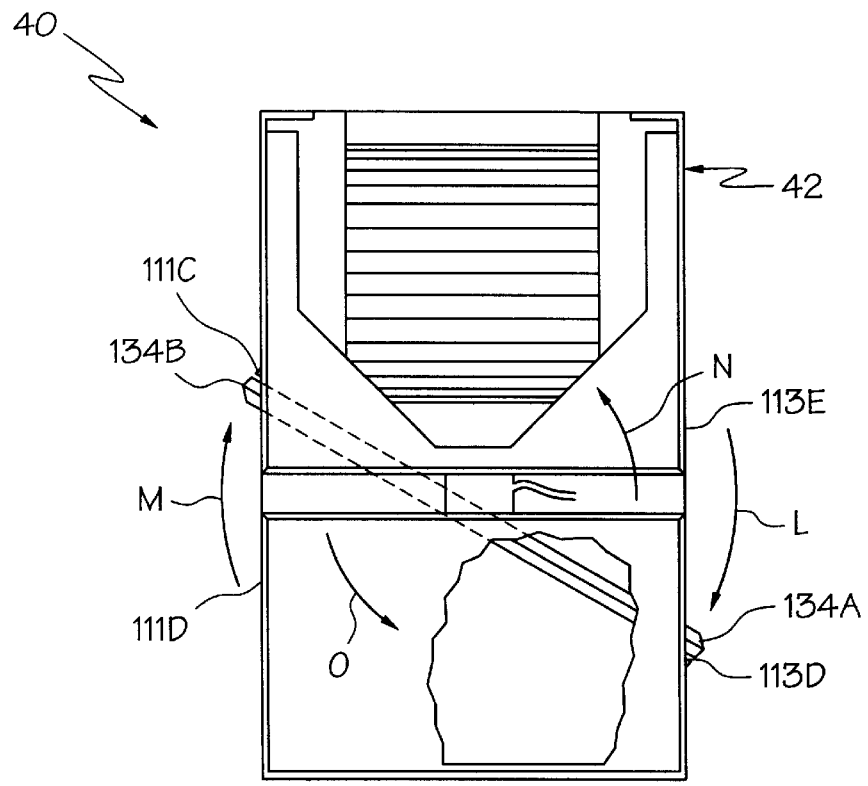
FIG. 8 is a top plan view of the instant invention with portions therein being broken away for the purpose of illustration.

In operation, damper element 130 pivots in horizontal displacement along pivotal mount 131 between the first configuration and the second configuration as herein discussed. As it pivots, fin 142A rides along an upper surface 146 of a lower panel section 148 of section 114, and a lower edge 113B of opening 113A, and a lower edge 111B of opening 111A, and all further in substantially sealing engagement. Similarly, fin 140A rides along a lower surface 150 of an upper panel section 152 of section 114, and an upper edge 113C of opening 113A, and an upper edge (not herein specifically shown) of opening 111A, and further all in substantially sealing engagement. Furthermore, as can also be seen in FIG. 8, when damper 130 is disposed in the first configuration as shown and as indicated by arrowed lines L and M, portions proximate a first outer edge 134A of upstanding panel member 134 are sealingly engaged with a first side edge 113D of opening 113A, while portions proximate a second outer edge 134B of upstanding panel member 134 are sealingly engaged with a second side edge 111C of opening 111A.

When damper 130 is disposed in the second configuration, portions proximate the first outer edge 134A of upstanding panel member 134 are sealingly engaged with a second side edge 113E of opening 113A, while portions proximate the second outer edge 134B of upstanding panel member 134 are sealingly engaged with a first side edge 111D of opening 111A.

Figure 10:
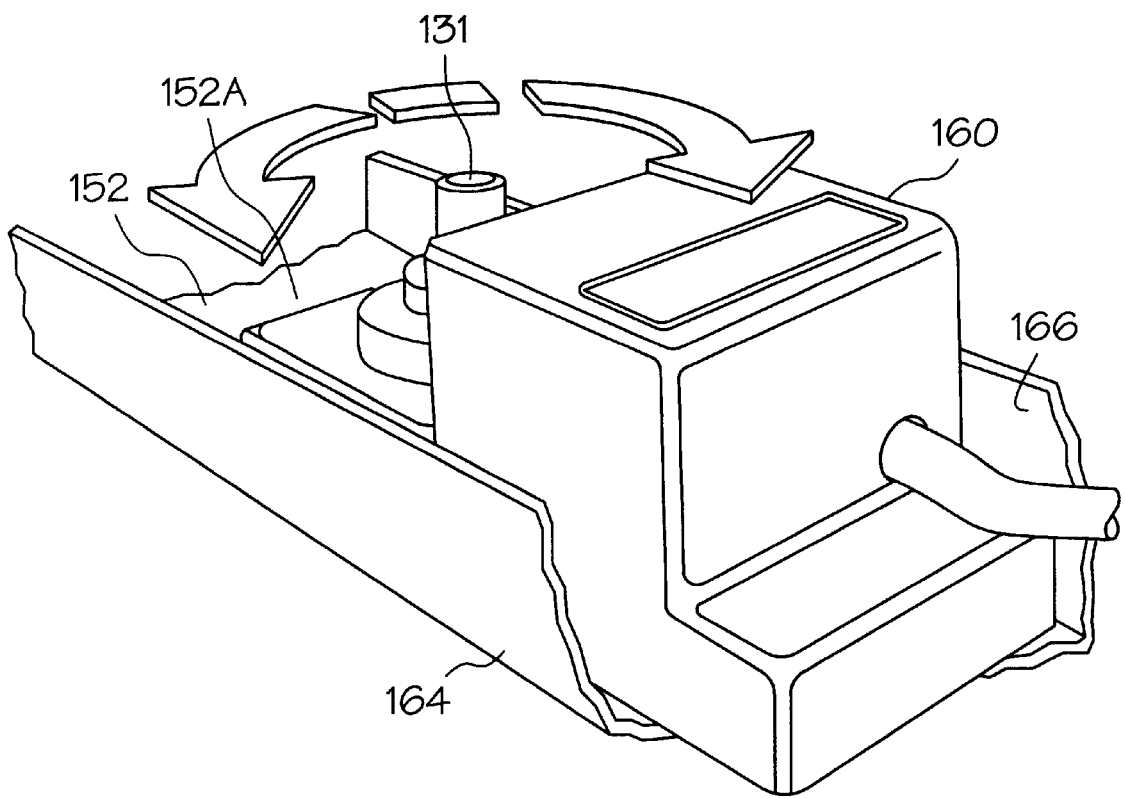
FIG. 10 is an enlarged fragmentary perspective view of a switch.
Figure 11:
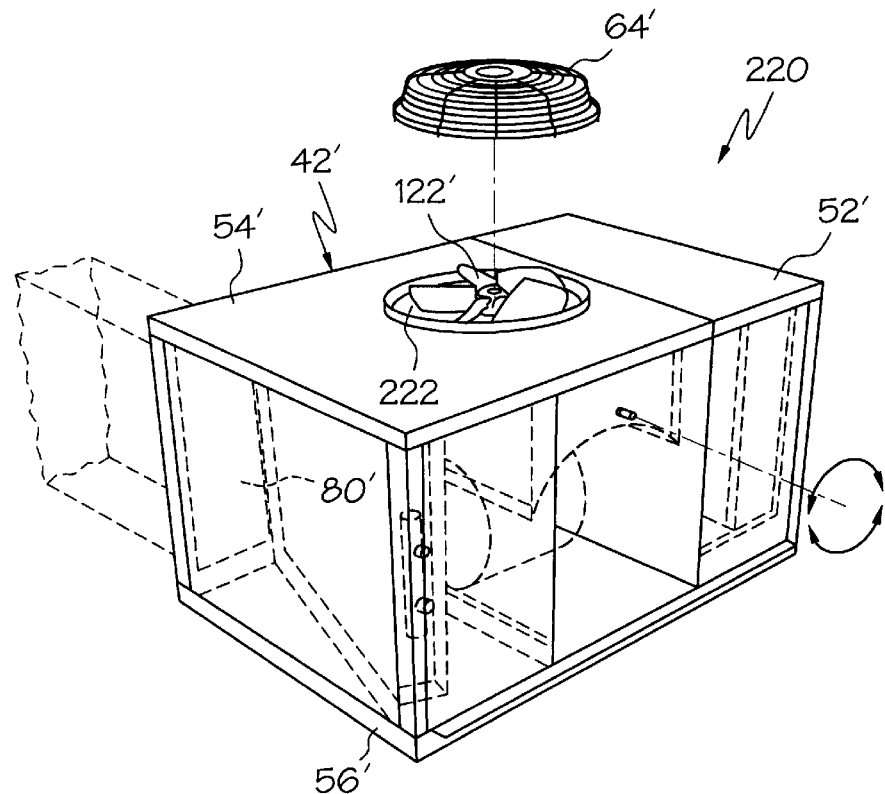
FIG. 11 is a partial exploded rear perspective view of an alternate embodiment of the instant invention.
Figure 12:
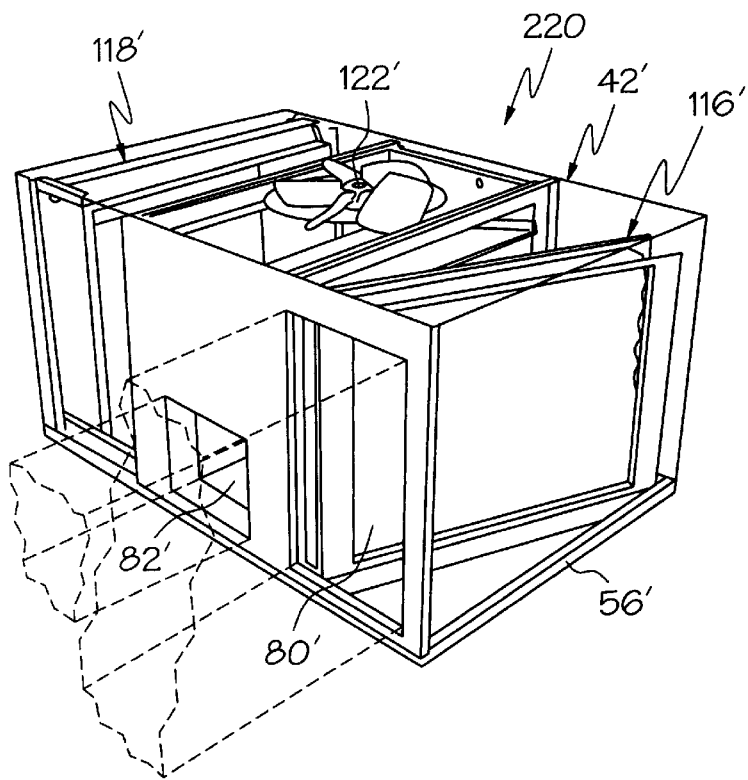
FIG. 12 is a rear perspective view of the embodiment first depicted in combination with FIG. 11 with portions therein broken away for the purpose of illustration.
Figure 13:
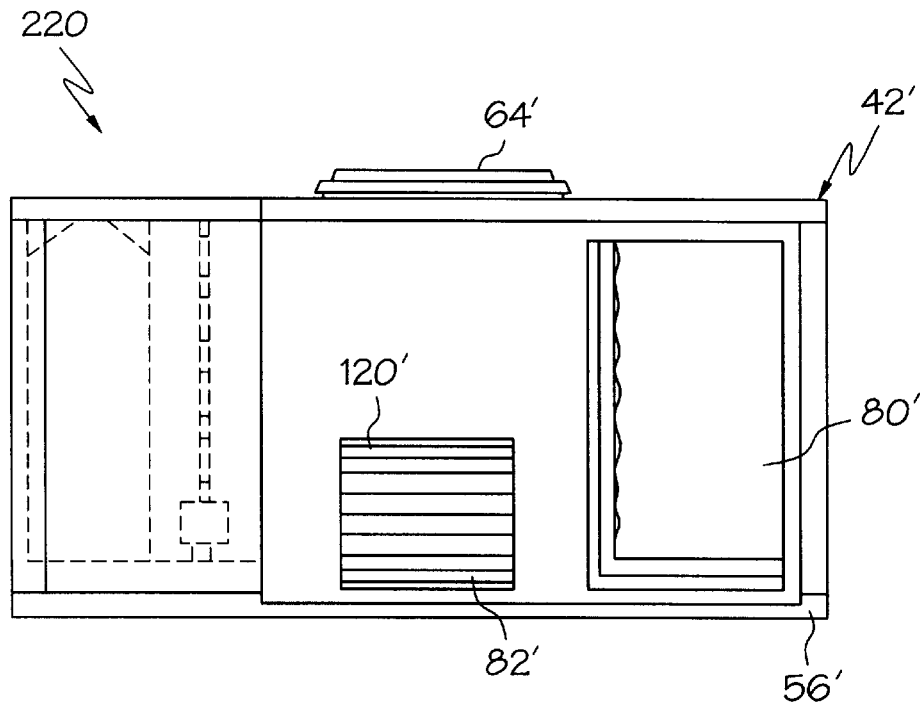
FIG. 13 is a rear elevational view of the embodiment first depicted in combination with FIG. 11.
Figure 14:
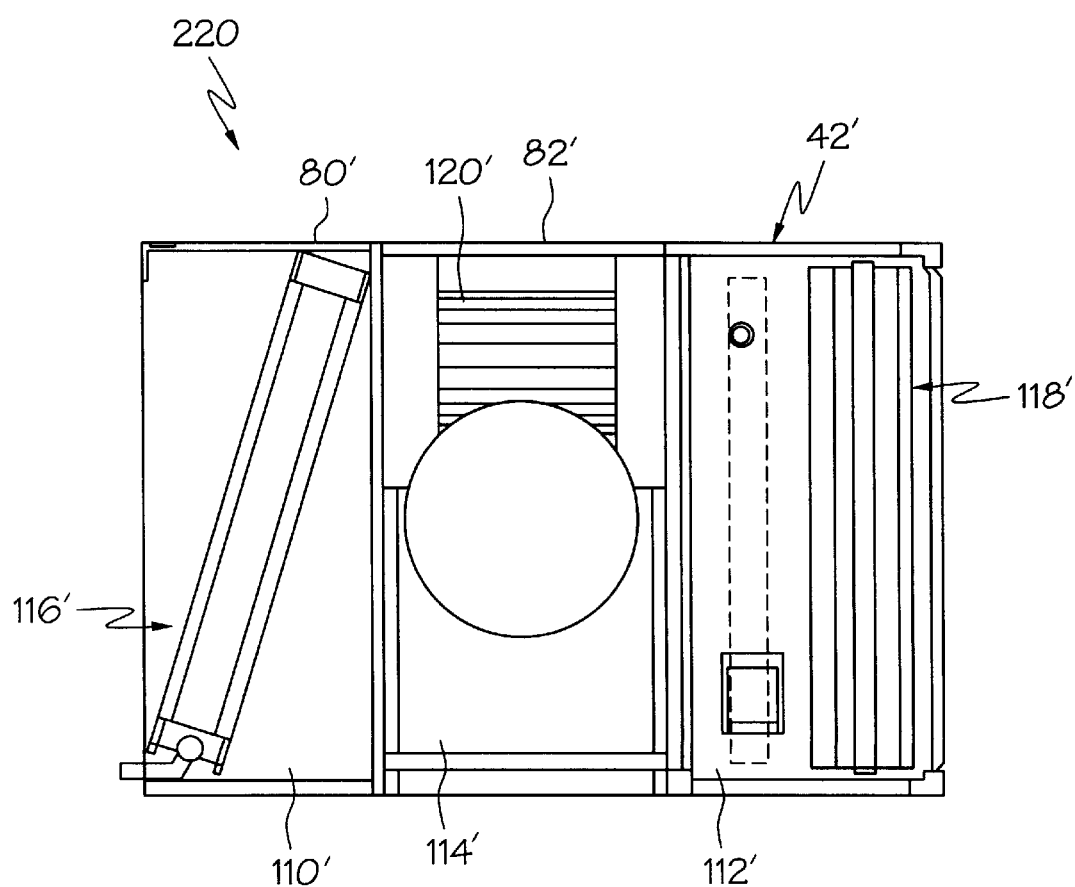
FIG. 14 is a top plan view of the embodiment depicted in combination with FIG. 13.

With continuing reference to FIG. 7, and further reference to FIG. 10, unit 40 includes a motor-driven actuator mechanism 160 operational for displacing the damper element between the first configuration and the second configuration. The actuator mechanism 160, seen housed within a channel 162 defined by two upstanding sidewalls, 164 and 166, coupled to portions of an upper surface 152A of upper panel section 152, is of the conventional type. Accordingly, the specific details of the actuator mechanism 160 will not be herein specifically addressed as they will be readily apparent to those having ordinary skill in the relevant art.

Figure 20:
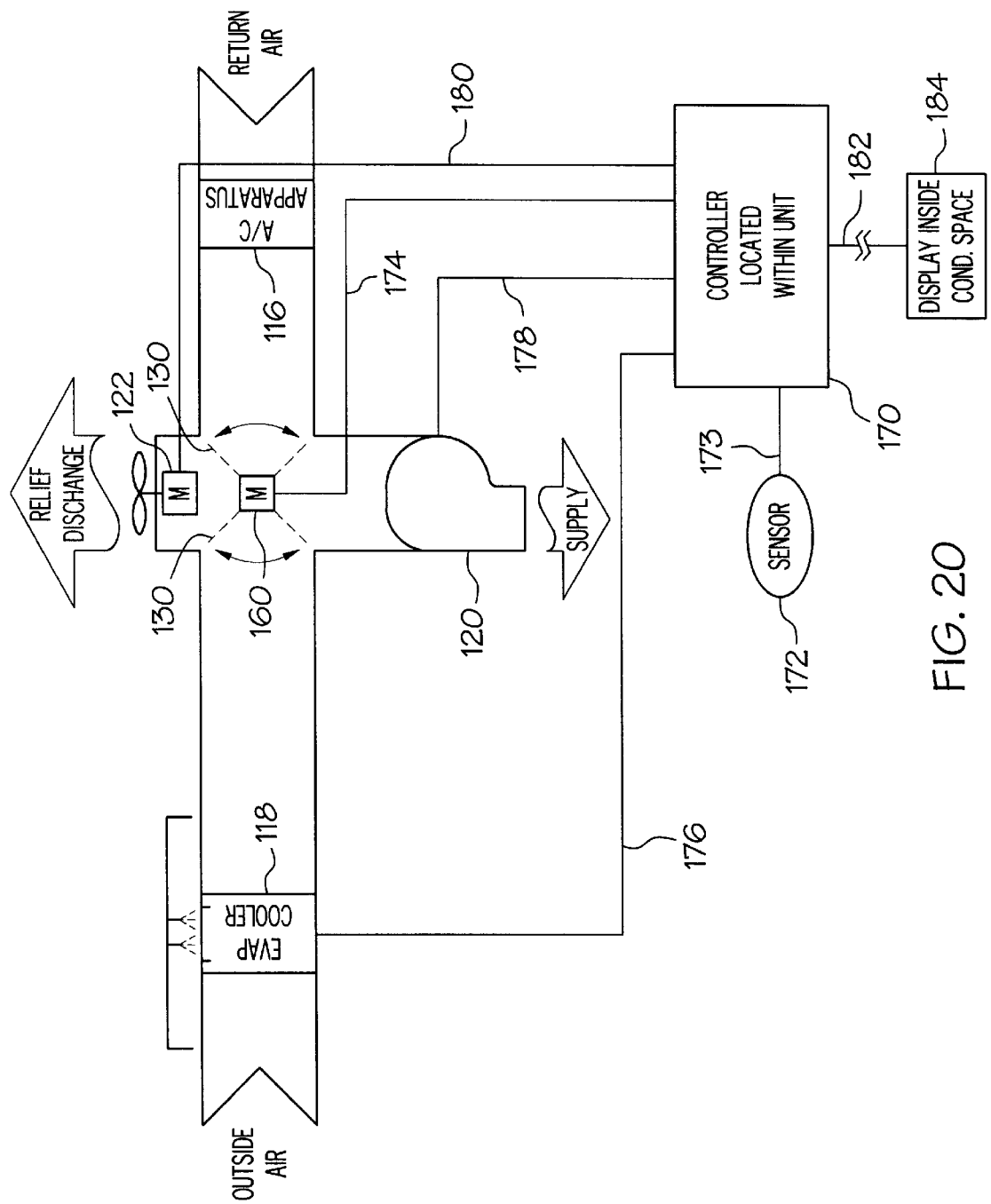
FIG. 20 is a schematic representation of an embodiment of the instant invention consistent for use in combination with the embodiment depicted in combination with FIG. 1, and for use in combination with the embodiment depicted in combination with FIG. 11.

Referring again to FIG. 7, and taken in conjunction with FIG. 20, and the previous description herein directed towards FIG. 3 and FIG. 4, unit 40 includes a controller 170 that is in electrical communication with the air-conditioning apparatus 116, the evaporative cooling apparatus 118, the blower 120, the fan 122, and the damper element 130. As has been earlier discussed, as is typical with conventional evaporative cooling systems and apparatus, the cooling efficiency of the evaporative cooler apparatus 118 decreases when the 1% coincident wet bulb temperatures are high, of which will be understood by those having ordinary skill with respect to evaporative cooling systems and apparatus. Accordingly, as 1% coincident wet bulb temperatures increase, the cooling capabilities of the evaporative cooling apparatus 118 becomes less effective in keeping the enclosed space of a structure proximate a selectively desired comfort range. However, as is typical with conventional air-conditioning systems, air-conditioning apparatus 116 usually always operates quite well regardless of the external environmental temperature.

However, since typical air-conditioning systems use more electrical power than conventional evaporative cooler systems, it is not very economical to use air-conditioning apparatus 116 exclusively when cooling the enclosed space of a structure. Yet, since evaporative cooling systems and apparatus, although less expensive to operate, serve as a sufficient cooling means only when the external environmental conditions permit, the controller 170 is coupled to a sensor 172 operative for sensing the external environmental conditions such as the temperature and humidity and the wet bulb temperatures.

Accordingly, when unit 40 is actuated, the sensor 172 senses the external environmental conditions and communicates the information via electrical interconnection 173 to controller 170. If the external environmental conditions are sensed as being suitable for operation of the evaporative cooling apparatus 118 for cooling the enclosed space of a structure, the controller sends an electrical signal via electrical interconnection 174 to the actuator mechanism 160 which in turn disposes damper element 130 in the first configuration. Additionally, the controller 170 further sends an electrical signal via electrical interconnection 176 to the evaporative cooling apparatus 118 for actuating the evaporative cooling apparatus 118, sends an electrical signal via electrical interconnection 178 to the blower 120 for actuating the blower 120, and sends an electrical signal via electrical interconnection 180 to the fan 122 for actuating the fan 122.

If the external environmental conditions are sensed as being unsuitable for efficient operation of the evaporative cooling apparatus 118 for cooling the enclosed space of a structure, the controller sends an electrical signal via electrical interconnection 174 to the actuator mechanism 160 which in turn disposes damper element 130 in the second configuration. Additionally, the controller further sends an electrical signal via electrical interconnection 176 to the evaporative cooling apparatus 118 for turning it off, sends an electrical signal via electrical interconnection 178 to the blower 120 for actuating the blower 120, and sends an electrical signal via electrical interconnection 180 to the fan 122 for either actuating the fan 122, or turning the fan 122 off, whichever is selectively desired by the user.

As can be seen from FIG. 20, controller 170 is connected by means of electrical interconnection to a display panel 184 which displays a variety of data consistent with the use and operation of unit 40. Preferably mounted within a structure for facilitating easy access by a user, display panel 184 in FIG. 19 includes a liquid crystal display 186 for displaying the data and includes a plurality of buttons cooperative therewith for inputting a variety of information. For instance, button 188 is operative for allowing a user to display the operating mode of unit 40, such as whether the unit 40 is heating or cooling. Button 190 is operative for inputting a selected temperature or temperature range, conforming to a selected comfort range that a user desires the enclosed space to be set. Buttons 192 and 194 enable one to display on the display 186 the inside temperature and the outside temperature respectively. Additionally, button 196 allows one to reset the entire system. Furthermore, buttons 198, 200, and 202, are operative for allowing one to display the operation status, the day, and the time of day, respectively.

Figure 19:
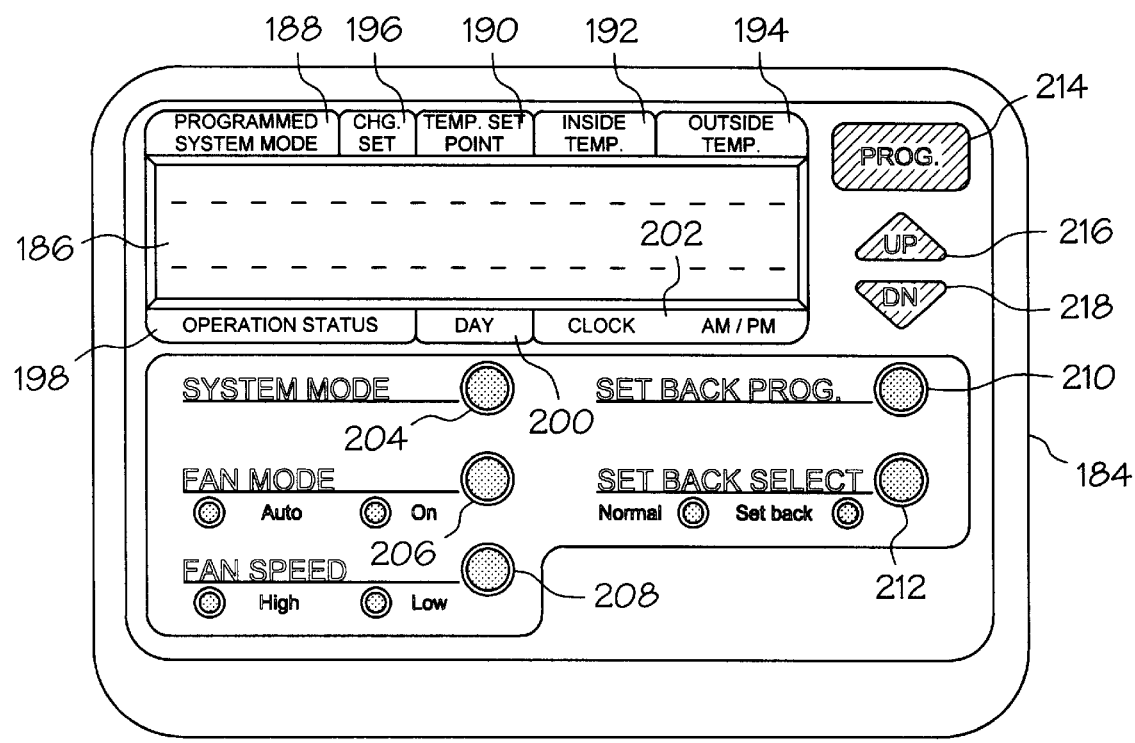
FIG. 19 is a top plan view of a control panel of the instant invention.

With continuing reference to FIG. 19, the display panel 184 also includes a system mode button 204 to allow one to set the operating mode of unit 40 to either heating or cooling, a fan mode button 206 for allowing one to either operate fan 122 manually, or for allowing the fan 122 to work automatically. Fan speed button 208 allows one to adjust the speed of fan 122 to either high or low, and the set back program button 210 and the set back select button 212 enable one to select specific running times for selective and automatic operation of unit 40. Finally, program button 214, used in combination with up button 216 and down button 216, allow one to selectively scroll along a set menu of selected program modes.

As it will be understood, once a selected operating mode has been programmed into controller 170 by means of display panel 184, the unit 40 will operate automatically without manual adjustment for either selectively heating or cooling the enclosed space of a structure to maintain the enclosed space proximate a selectively desired comfort range. When cooling, controller 170 will selectively switch the unit 40 back and forth from the first configuration to the second configuration for allowing optimal cooling efficiency while conserving electricity and water used by the evaporative cooling apparatus 118. Furthermore, when the unit 40 is in heating mode thereby heating the enclosed space of a structure, the unit will be configured in the second configuration.

The damper element 130, in combination with the controller 170 and its associated elements, serve as a control means operative as a control mechanism for automatically and selectively switching the unit 40 from the first configuration to the second configuration, for maintaining the environment in the enclosed space of a structure proximate a selectively desired comfort range, and for exploiting the operating efficiency of the air-conditioning apparatus 116 and the evaporative cooling apparatus 118 in combination with the external environmental conditions for providing efficiently conditioned air into the enclosed space and for conserving utilities.

Turning now to FIG. 11, FIG. 12, FIG. 13, FIG. 14, FIG. 15, and FIG. 16, there is seen an alternate embodiment of the instant invention generally designated by the reference character 220, which in general similarity to the previously described embodiment generally designated by the reference character 40 includes substantially the same elements. For the purposes of clarity, the specifically referenced common parts will be indicated consistent with those specifically described in combination with unit 40. However, the instant reference characters will further include a prime symbol, such as for example (reference character)'. Accordingly, like unit 40, heating and cooling unit includes housing 42' having the end panel 44', the removable first top panel 52', the removable second larger top panel 54', and base panel 56'. Also included is air inlet port 80', air outlet port 82', section 110', section 112', section 114', the air-conditioning apparatus 116', the evaporative cooler apparatus 118', the blower 120', the fan 122', the protective grating 64', the damper element 130', and the actuator mechanism 160'.

The immediate embodiment differs from the previous embodiment in that the fan 122' is disposed proximate an exhaust port 222 formed through portions of the second larger top panel 54', which can further be seen in FIG. 16. Additionally, damper element 130', of which can be seen in FIG. 15, is mounted to portions of housing 42' proximate section 114' by means of a pivotal mount 224, the damper element 130' being mounted for reciprocal vertical pivotal movement.

Figure 15:
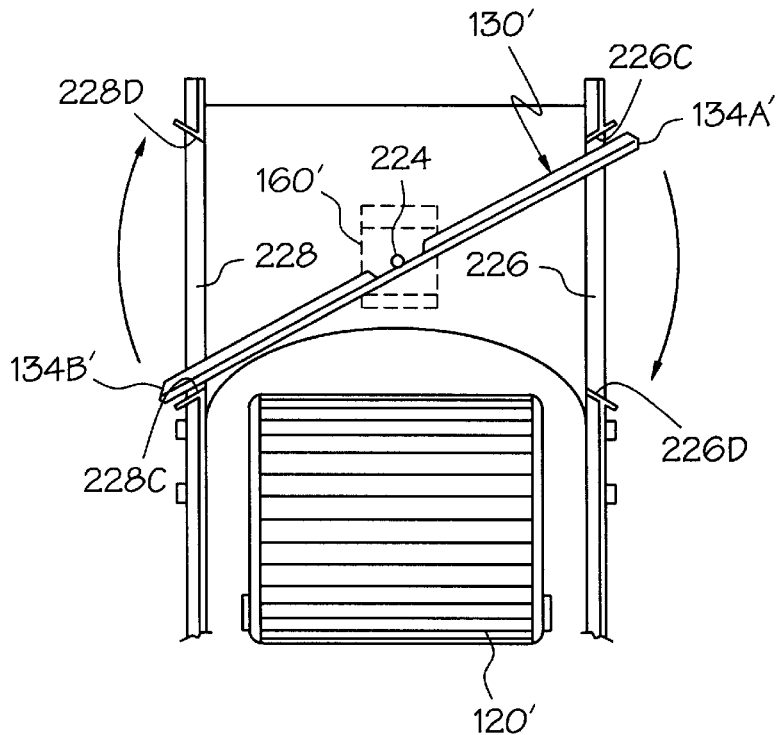
FIG. 15 is a fragmented rear elevational view of portions of the embodiment first depicted in combination with FIG. 11, and further illustrating a damper.

With respect to section 114' illustrated in FIG. 15 and FIG. 16, and like previously described section 114, partition 113' includes opening 226 extending therethrough being generally rectangular in shape and being defined by side edges, 226A and 226B respectively, and upper and lower edges, 226C and 226D respectively. Similarly, partition 111' includes opening 228 extending therethrough and also being generally rectangular in shape and being defined by side edges, 228A and 228B respectively, and lower and upper edges, 228C and 228D respectively. The specific details of damper element 130', of substantially identical construction to damper element 130, will not be herein again specifically described, as they have been herein specifically described in combination with FIG. 7, FIG. 8, and FIG. 9.

Figure 17:
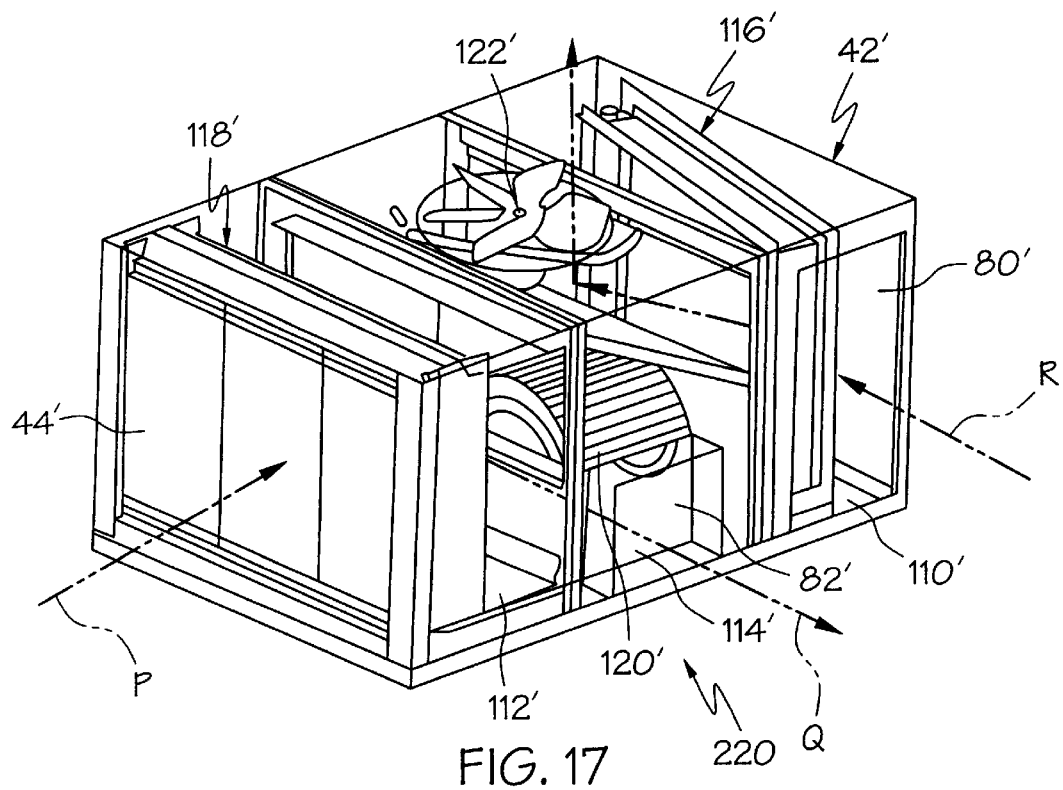
FIG. 17 is a perspective view of the embodiment first depicted in combination with FIG. 11 with portions therein being broken away for the purpose of illustration.
Figure 18:
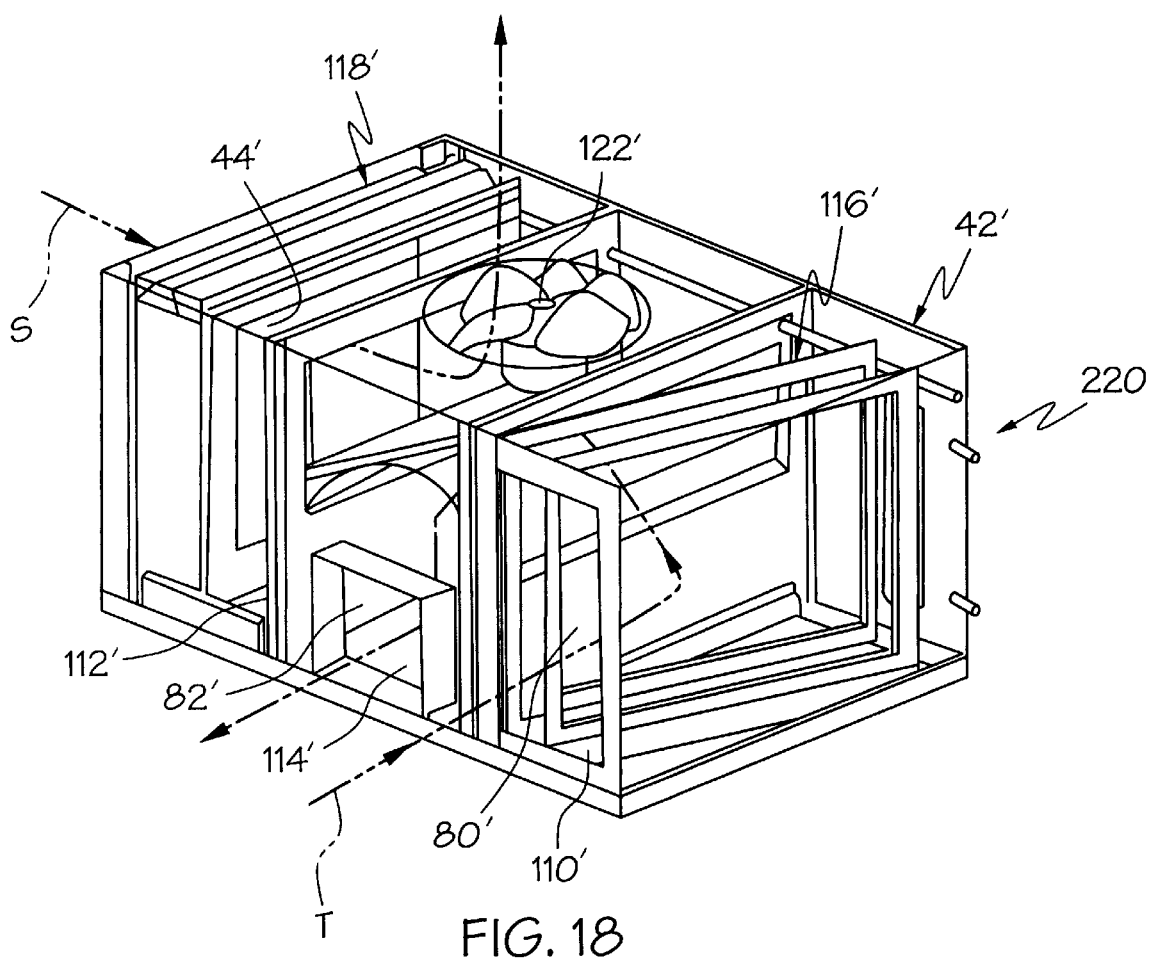
FIG. 18 is a view very similar to the view of FIG. 17.

With continuing reference to FIG. 15 and FIG. 16, and additional reference to FIG. 17 and FIG. 18, damper element 130' is movable between the first configuration and the second configuration. In particular, when damper 130' is disposed in the first configuration as shown in FIG. 15, and FIG. 17, portions proximate the first outer edge 134A' of damper element 130' are sealingly engaged with upper edge 226C of opening 226, while portions proximate the second outer edge 134B' of damper element 130' are sealingly engaged with lower edge 228C of opening 228.

In this first configuration, as can be seen in FIG. 16, when blower 120' is operating and thereby sucking air in from outside unit 220, and blowing the air into the enclosed space of a structure, the air passes in the direction indicated by arrow P through end panel 44', into section 112' and through evaporative cooling apparatus 118'. From the evaporative cooling apparatus 118', the air then passes through opening 226 and into section 114' and against portions of damper element 130', into the blower 120', and out from the blower 120' through air outlet port 82' and into the enclosed space of a structure in the direction as indicated by arrow Q. Furthermore, when unit 220 is actuated, both the blower 120' and fan 122' are actuated and operational. Fan 122' operates for blowing air provided from the enclosed space out of exhaust port 222 which indicates that fresh air provided from outside the unit 220 is constantly being supplied into the structure and then selectively expelled as exhaust from exhaust port 220.

Once the air has been introduced into the enclosed space of the structure, the air is then drawn out of the enclosed space, either directly or indirectly as through ducts, by fan 122' and further as a result of the positive pressure buildup within the structure. As a result, the air passes in the direction indicated by jagged arrow R into section 110' through air inlet port 80' and through the air-conditioning apparatus 116' which is turned off when the evaporative cooling apparatus 118' is running. From the air-conditioning apparatus 116', the air then passes through opening 228 and into section 114' and against portions of damper element 130', through fan 122' and upwardly out of exhaust port 222.

When damper 130 is disposed in the second configuration, portions proximate the first outer edge 134A' of damper element 130' are sealingly engaged with the lower edge 226D of opening 226, while portions proximate the second outer edge 134B' of damper element 130' are sealingly engaged with the upper edge 228D of opening 228.

Referring to FIG. 18, the damper element 130' is shown disposed in the second configuration. In the second configuration, the evaporative cooling apparatus 118' is not operational, and the air-conditioning apparatus 116' operational for either heating the enclosed space, or cooling the enclosed space. In the second configuration, and as indicated by the jagged arrow S, air from outside unit 220 can be seen as passing through end panel 44' and into section 112'. From section 112', the air then passes through opening 226 and into section 114', the air then being directed against portions of damper element 130' and then upwardly out the exhaust port 222. Further provided in this second configuration, the air-conditioning apparatus 116' is operational with blower 120' blowing and recirculating the air within the enclosed space of the structure, the air-conditioning apparatus 116' operative for either selectively cooling or heating the air.

In further detail, air from the enclosed space of the structure passes in the direction indicated by jagged arrow T through air inlet port 80' and into section 110'. From section 110', the air then passes through the air-conditioning apparatus 116' and is either heated or cooled. From the air-conditioning apparatus 116', the air then passes through opening 228 into section 114' and then passes against portions of damper element 130', through blower 120' and is then projected from the blower 120 through air outlet port 82' and into the enclosed space either directly or indirectly by means of a duct.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method for operating a combined air-conditioning and evaporative cooling system that maintains a structurally enclosed space proximate a desired comfort range, said combined air-conditioning and evaporative cooling system having a first configuration that exploits an evaporative cooling apparatus and a second configuration that exploits an air-conditioning apparatus, said evaporative cooling apparatus and said air-conditioning apparatus having a common air inlet port that receives air from said enclosed space and a common air outlet port in fluid communication with said enclosed space, and said combined system having a blower residing in said air outlet port, said method comprising the steps of:

sensing external ambient temperature;

determining said desired comfort range;

selecting one of said first configuration and said second configuration in response to said external ambient sensing step and said determining step, wherein said sensing, determining, and selecting steps are performed by a controller actuating a damper element in response to said selecting step to configure said system to operate in said selected configuration, said controller driving an actuator mechanism in communication with said damper to dispose said damper and change said combined system between said first configuration and said second configuration; and energizing, when said damper is in said first configuration, an exhaust fan located in an exhaust port that is in fluid communication with said air inlet port.

2. A method as claimed in claim 1 wherein said sensing step additionally senses external ambient humidity.

3. A method as claimed in claim 1 additionally comprising the step of:

activating one of said evaporative cooling apparatus and said air-conditioning apparatus after said actuating step is complete.

4. A method as claimed in claim 3 additionally comprising the step of:

starting said blower residing in said common air outlet port after said selecting step.

5. A method as claimed in claim 1 wherein:

said sensing step, said determining step, and said selecting step are performed by a programmable controller;

said programmable controller receives user input information through a display panel; and said determining step comprises the step of obtaining a user-supplied comfort range from said display panel.

6. An apparatus for selectively maintaining a structurally enclosed space proximate a desired comfort range, said apparatus comprising:

a housing having air-communication with said space and with an external environment, said housing including:
      a main inlet that receives air from said external environment;
      an air outlet port in fluid communication with said enclosed space;
      an air inlet port that receives air from said space; and
      an air exhaust port from which air is expelled to said external environment;

an exhaust fan in said exhaust port, said fan being positioned to draw air from said inlet port through said exhaust port to said external environment;

a blower in said outlet port;

an evaporative cooling apparatus, positioned in said housing to use said blower to selectively cool said space;

an air-conditioning apparatus, positioned in said housing to use said blower to selectively cool said space;

an actuator mechanism positioned in said housing;

a damper element coupled to said actuator mechanism, said actuator mechanism being operable to move said damper element between a first configuration that exploits said evaporative cooling apparatus and a second configuration that exploits said air-conditioning apparatus;

a controller coupled to said exhaust fan, said blower, and said actuator mechanism such that said controller selectively disposes said damper element in one of said first configuration and said second configuration and activates said exhaust fan when said damper element is disposed in said first configuration.

7. An apparatus as claimed in claim 6 additionally comprising:

an external ambient temperature sensor coupled to said controller; and an external ambient humidity sensor coupled to said controller.

8. An apparatus as claimed in claim 7 wherein said controller is additionally coupled to a display panel and said controller is a programmable controller.

9. An apparatus as claimed in claim 8 wherein said exhaust fan has a plurality of operating speeds, said operating speeds being automatically adjusted by said programmable controller and manually adjusted by user-input supplied through said display panel.

10. An apparatus as claimed in claim 8 wherein:

said programmable controller receives a user-supplied comfort range from said display panel; and said controller is configured to cause said damper element to be disposed in one of said first and second configurations in response to said user-supplied comfort range, and in response to temperature and humidity signals obtained from said temperature and humidity sensors, respectively.

11. An apparatus as claimed in claim 10 wherein said controller is configured to start said blower after said controller disposes said damper element.

12. An apparatus as claimed in claim 6 wherein:

said damper element is pivotally mounted at a generally intermediate position of said damper element.

13. An apparatus for selectively maintaining a structurally enclosed space proximate a desired comfort range, said apparatus comprising:

a housing having air-communication with said space and with an external environment, said housing including:
   a main inlet that receives air from said external environment;
   an air outlet port in fluid communication with said enclosed space;
   an air inlet port that receives air from said space; and
   an air exhaust port from which air is expelled to said external environment;

a blower positioned in said outlet port;

an evaporative cooling apparatus, positioned in said housing to use said blower to selectively cool said space;

an air-conditioning apparatus, positioned in said housing to use said blower to selectively cool said space;

an actuator mechanism positioned in said housing;

a damper element pivotally mounted at a generally intermediate position of said damper element and coupled to said actuator mechanism, said actuator mechanism being operable to move said damper element between a first configuration that exploits said evaporative cooling apparatus, and a second configuration that exploits said air-conditioning apparatus;

an exhaust fan positioned in said exhaust port such that said exhaust fan draws air from said inlet port through said exhaust port to said external environment when said damper is disposed in said first configuration;

an external ambient temperature sensor that provides an external temperature signal;

an external ambient humidity sensor that provides an external humidity signal;

a display panel that provides for input of a user-supplied comfort range; and a programmable controller coupled to said ambient temperature sensor, said ambient humidity sensor, said display panel, said exhaust fan, said blower, and said actuator mechanism, said controller being configured to selectively dispose said damper element in one of said first configuration and said second configuration in response to said external temperature signal, said external humidity signal, and said user-supplied comfort range, and said controller being configured to start said blower after disposing said damper and to activate said exhaust fan when said damper element is disposed in said first configuration.

\* \* \* \* \*